No. 876,986. PATENTED JAN. 21, 1908.
H. MARER.
MONITORY COMBINATION WEIGHING SCALE.
APPLICATION FILED AUG. 2, 1907.
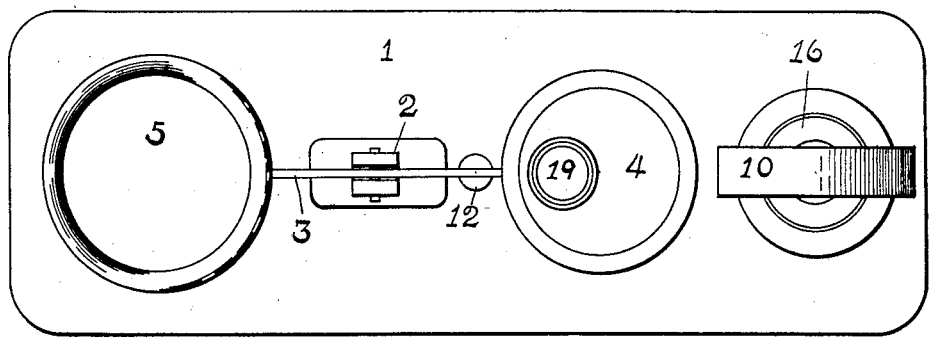
Fig-1-
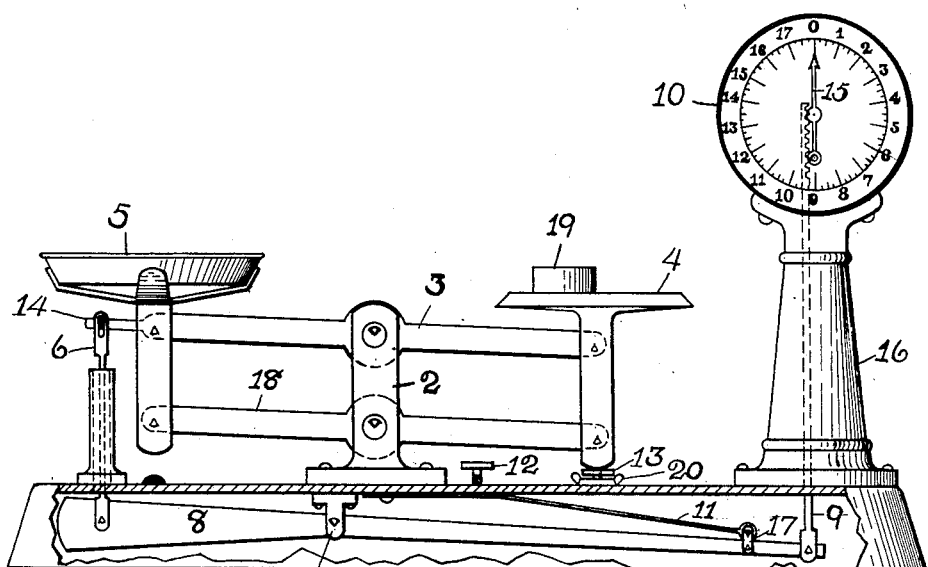
Fig-2-
WITNESSES:
John E. Heller.
Minnie C. Rollwage.
INVENTOR
Henry Marer.
BY
Abraham Knobel,
ATTORNEY

UNITED STATES PATENT OFFICE.

HENRY MARER, OF LOUISVILLE, KENTUCKY, ASSIGNOR TO MONITORY SCALE COMPANY, INCORPORATED, OF LOUISVILLE, KENTUCKY, A CORPORATION OF KENTUCKY.

MONITORY COMBINATION WEIGHING-SCALE.

No. 876,986.   Specification of Letters Patent.   Patented Jan. 21, 1908.

Application filed August 2, 1907. Serial No. 386,800.

*To all whom it may concern:*

Be it known that I, HENRY MARER, a citizen of the United States, residing at Louisville, in the county of Jefferson and State of Kentucky, have invented a new and useful Improvement in Monitory Combination Weighing-Scales, of which the following is a specification.

This invention relates especially to grocer's scales being adapted to weighing merchandise, such as sugar, for example, which is poured gradually into the scale pan until a desired quantity is attained.

It is well known that even scales, comprising a beam pivoted at the middle and having a pan at each end, are more accurate than scales which depend for their operation upon tension, compression, or torsion springs or other instrumentalities. A serious difficulty which the grocer has experiences with even scales is that he cannot tell when he is approaching the full measure of the quantity desired, and therefore, generally, an excess quantity is poured into the scale, necessitating removal of the excess to balance the scales. If the customer is present when this is done, the act may be regarded as parsimonious, and so the excess is generally given to the loss of the dealer. The difficulty experienced with the spring scales has been that, while they indicate gradually the amount of merchandise put into the pan, yet, when they are constructed to weigh large quantities, they are not sufficiently sensitive for weighing small quantities accurately, and it has been found desirable to have different scales in the same store of different seizes to weigh different quantities. This occasions an extra outlay for scales, and the scales occupy space which could be used otherwise to good advantage. I have overcome these difficulties by combining the even scale and the spring scale in the way hereinafter described.

The objects of my improvement are to avoid the difficulties just mentioned, and to do this in an effective manner, and by means of the mechanism illustrated in the accompanying drawing in which—

Figure 1 is a top plan view; and Fig. 2 is a side elevation with a portion of the base broken away to show the inclosed mechanism.

Similar reference numerals refer to similar parts throughout the several views of the drawing.

A hollow base 1 is surmounted by a fulcrum-stand 2. In the fulcrum-stand is pivotally mounted the beam 3, such as is usual in even scales, and, preferably, a lower parallel beam 18. On the ends of beam 3 are pivotally mounted, in the usual way, a scale-pan 4, for receiving the weights 19, and the pan 5, for receiving the merchandise to be weighed. A finger 14 extends from the end of beam 3 which carries pan 5. One end of base 1 is surmounted by a hollow standard 16, which in turn is surmounted by dial 10. On the dial 10 is pivotally mounted a hand or indicator 15. The dial is graduated to indicate ounces and fractions of an ounce. Underneath and within base 1 is mounted a second beam, 8, fulcrumed on a pending bracket 7 and so formed that the shorter end balances the longer end with the appurtenances. Beam 8 is connected with finger 14 by a vertical rod 6 by means of knife pivots. The opposite end of beam 8 is connected with dial 10 by a rod 9, also by means of a knife pivot. The upper end of rod 9 is provided with a rack, which meshes with a corresponding pinion mounted on the shaft which carries hand 15. A spring member 11 preferably a flat spring, as shown in Fig. 2, is rigidly secured to base 1 at one of its ends, and has its opposite end pivotally connected with beam 8 by means of a link 17. A set screw 12 serves to adjust the tension and position of spring member 11. The upper end of rod 6, where it is pivoted to finger 14, is slotted vertically, so as to allow some play of the pivot secured in finger 14. An adjusting screw 13, with a lock-nut 20, is provided in base 1 under pan 4, in order to limit the amplitude of the downward motion of said pan.

The operation of my invention will now be readily understood. The dealer wishes to weigh, say, ten pounds of sugar. He does not place a ten pound weight upon pan 4, as is done with the conventional even scales, but he places nine pounds of weights upon pan 4. He then pours the sugar rapidly into pan 5. When he has poured nine pounds, the beam 3 balances, finger 14 descends slightly till it strikes the bottom of the slot in rod 6. The spring scale member now begins to operate to weigh the final pound. Finger 11( 14 presses down rod 6, which in turn depresses the short end of beam 8, thus raising the long end and rod 9 pivoted thereto, and rod 9, through its rack turns hand 15. Beam 8 is moved against the force of spring member 11, which has been adjusted properly. The dealer sees when the even scale begins to balance, and also sees hand 15 advancing. He is thus admonished and now pours the sugar more carefully and stops when hand 15 reaches the sixteen-ounce mark. It will be understood that, in as much as spring member 11 is required to weigh only a small quantity, it can be very delicately adjusted and may be depended upon to weigh accurately, and it will also be appreciated that, however large the quantity the even scales are required to weigh, the spring member is still required to weigh only the small final fractional part. The dial 10 may be so arranged that it is visible both to the customer and the dispenser.

Having thus described my invention so that any one skilled in the art pertaining thereto may make and use it I claim—

In weighing scales, the combination of a hollow base, a fulcrum-standard, even scales comprising a beam, a weight-pan and a weighing-pan, and an indicating-scale member operatively connected with said even scales comprising a connecting-rod pivoted to the weighing-pan end of the scale beam of said even scales and extending into said base, a beam pivoted in said base, one end of said beam pivoted to said connecting-rod, a hollow standard on one end of said base, a dial provided with an indicator mounted on said hollow standard, and a rod extending through said hollow standard, pivoted to said beam in said base and operatively connected with the indicator of said dial by rack and pinion, all said parts so coöperating that when said even scale is balanced by the initial fractional part of the quantity to be weighed said indicating-scale member is brought into operation and indicates plainly by mensural parts the quantity added.

HENRY MARER.

Witnesses:
  MINNIE C. ROLLWAGE,
  JOHN E. HELLER.